Figure 1:
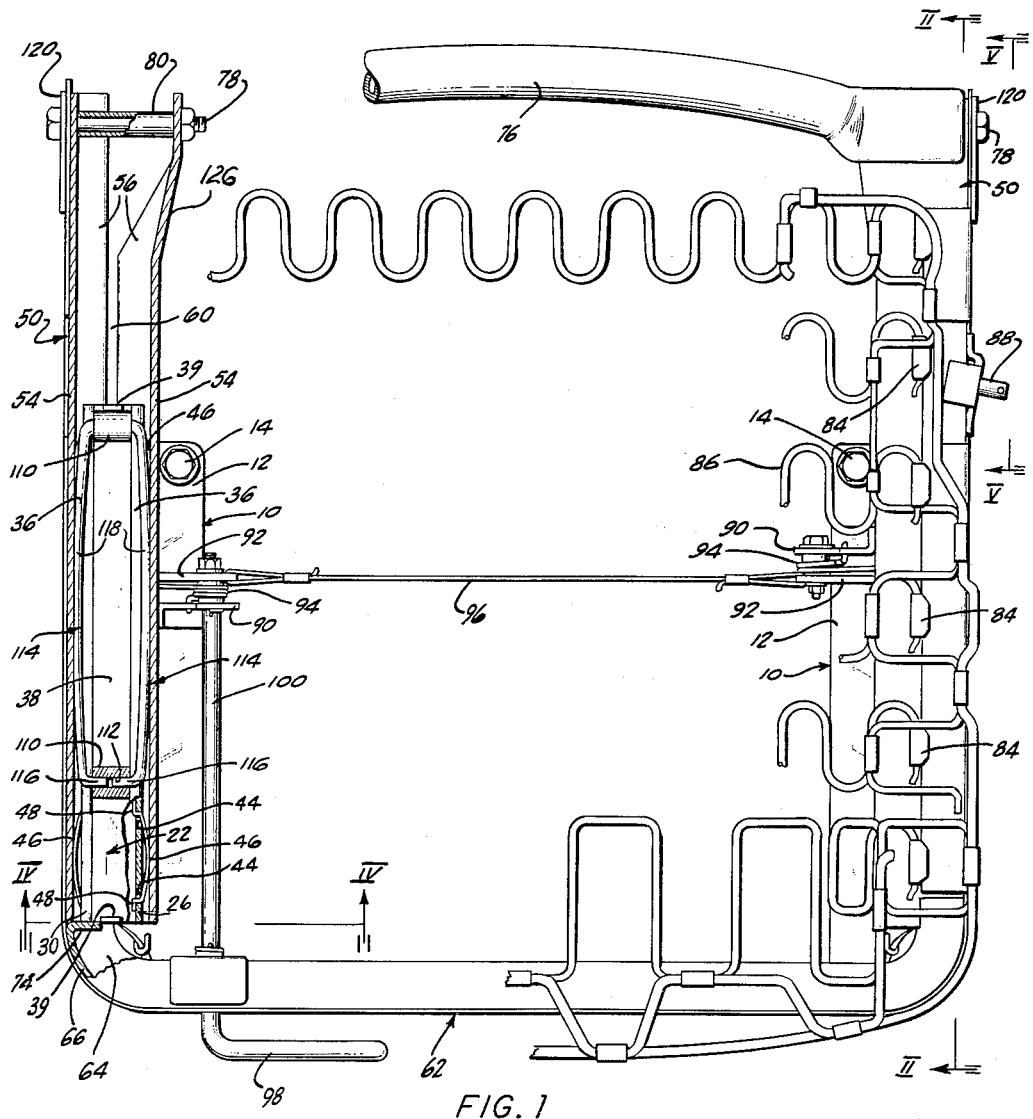

INVENTOR
JOHN M. CAUGHEY

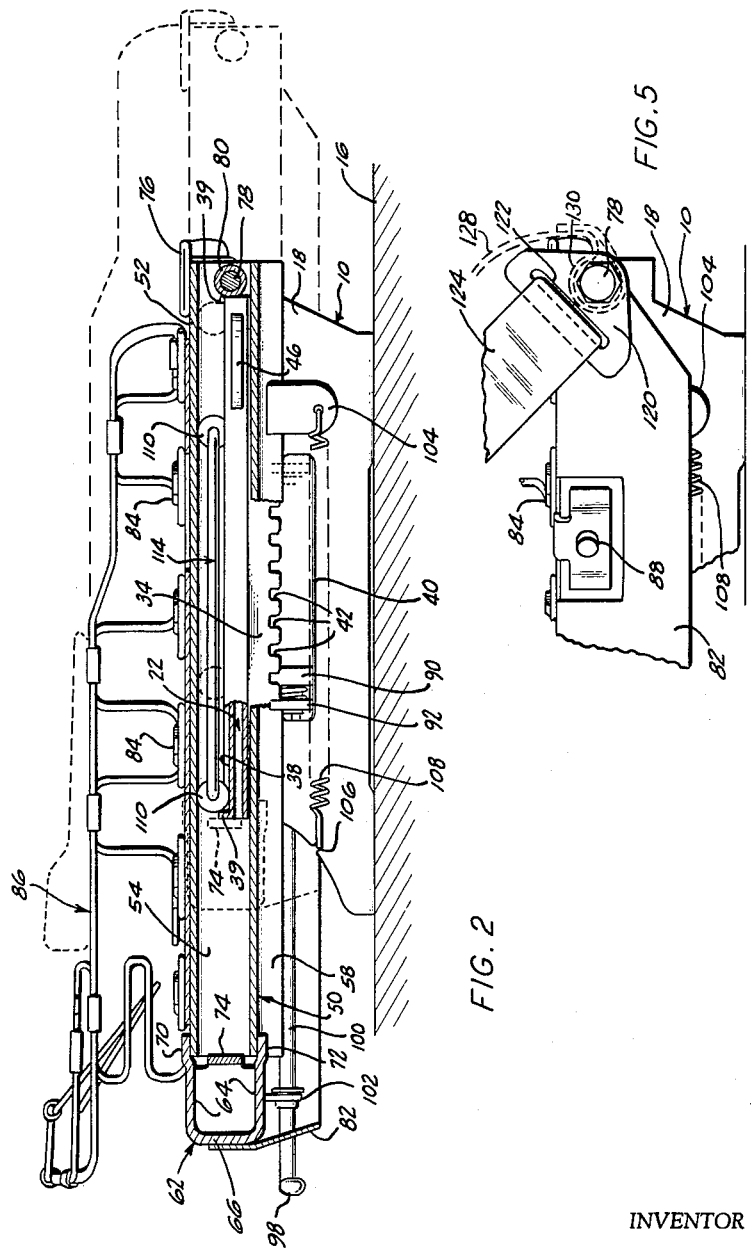

Nov. 30, 1965
J. M. CAUGHEY
3,220,690
SEAT ADJUSTING STRUCTURE
Filed Nov. 4, 1963
3 Sheets-Sheet 3
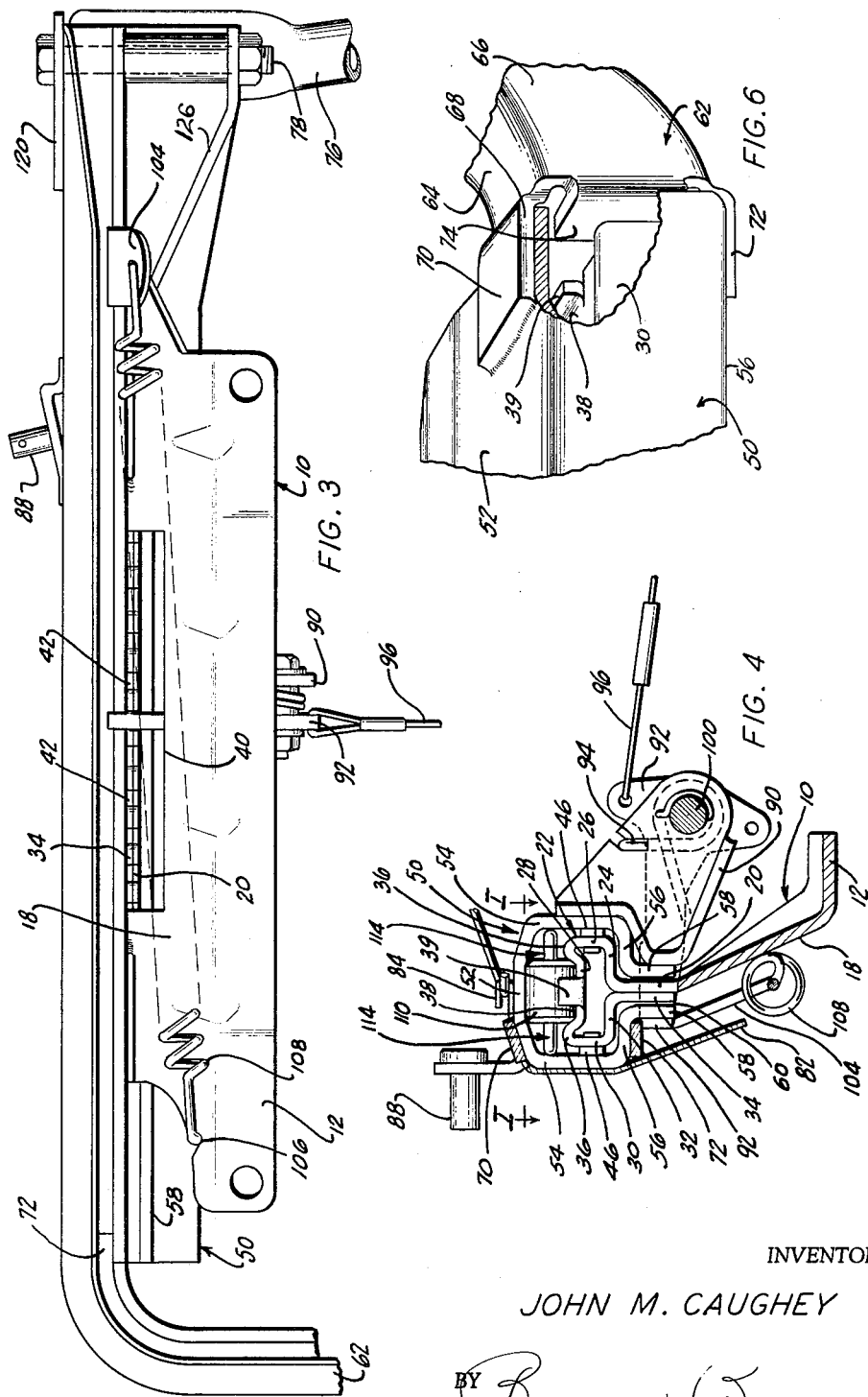
INVENTOR
JOHN M. CAUGHEY
BY Beaman & Beaman
ATTORNEYS

United States Patent Office

3,220,690
Patented Nov. 30, 1965

3,220,690
SEAT ADJUSTING STRUCTURE
John M. Caughey, Adrian, Mich., assignor, by mesne assignments, to Hoover Ball and Bearing Company, Saline, Mich., a corporation of Michigan
Filed Nov. 4, 1963, Ser. No. 321,017
7 Claims. (Cl. 248—430)

The invention pertains to vehicle seat adjusting structure, and particularly relates to the type of seat adjusting structure employed in vehicles permitting the seats to be adjusted in the longitudinal direction of the vehicle.

Seat belts for the occupants of vehicles are becoming commonplace and standard equipment, as their value in protecting the occupants during a collision is becoming increasingly recognized. As a seat belt must be capable of withstanding several thousand pounds of tension to be effective, the common means of installation is to anchor the seat belts to the floor of the vehicle. The belts are then passed around or through the vehicle seat components to a position accessible to the seat occupant. When using seat belts anchored to the vehicle floor, the seat belt cannot be firmly adjusted by the seat occupant until the vehicle seat is adjusted to its desired position relative to the vehicle, in that adjustment of the vehicle seat toward or away from the steering wheel affects the seat belt position relative to the seat. Such anchoring of the seat belt to the vehicle floor is objectionable as it requires, or results in, the seat belt being loosened or removed if the vehicle seat is adjusted. Due to this inconvenience vehicle occupants, particularly drivers, often do not use the seat belts, even though available, if seat adjustments are required.

To overcome the aforementioned difficulties with regard to seat belt anchoring, it has been proposed that the seat belt be directly attached to the lower seat frame, whereby the belt anchor will move with the seat during seat adjustment. While this arrangement overcomes difficulties encountered with the seat belt during seat adjustment, previously it has been economically impractical to meet the SAE standards with regard to seat belt anchorage specifications with known adjustable seat constructions. SAE standards require that the seat belt be firmly anchored so as to withstand several thousand pounds of tension as may be experienced during a collision, and with normal seat adjustment structures, the application of such forces to the seat frame will, likely, lift the lower seat frame from the adjustment track, or otherwise permit the seat components to separate and, therefore, nullify the purpose of the seat belt or substantially reduce its value.

It is, therefore, a basic object of the invention to provide an adjustable seat mechanism whereby seat belts may be anchored to the adjustable seat portion, and the seat mechanism is capable of withstanding forces imposed thereon to meet SAE seat belt anchorage specifications without separation of the adjustable seat structure from its supporting structure.

Another object of the invention is to provide an adjustable seat structure of economical sheet metal construction which has very high strength characteristics.

A further object of the invention is to provide an adjustable seat structure employing an inner fixedly mounted track and a seat carriage slidably mounted on the track, wherein a readily manufacturable construction is produced and in interlocking relationship between the track and carriage results, which prevents the carriage from being lifted from the track even under very high upwardly and forwardly directed forces.

An additional object of the invention is to provide an adjustable seat structure employing a track and carriage, wherein antifriction roller means are interposed between the track and carriage and spacing means are associated with the rollers to maintain predetermined spacing therebetween and aid in laterally centering the rollers with respect to the carriage and track.

Another object of the invention is to provide an adjustable seat structure wherein an inner track is received within a seat carriage and resilient spring means are interposed between the lateral portions of the track and carriage to center the carriage on the track and to prevent undesirable movement and noise resulting from relative lateral movement of the carriage on the track.

A further object of the invention is to provide an adjustable seat structure employing a fixedly mounted track having a slidably moveable seat carriage located thereon, wherein a releasable latch is mounted on the carriage and latch-receiving recesses are defined on the track to permit locking of the carriage relative to the track. Abutment means are defined on the carriage for engaging the ends of the track, limiting extreme movement of the carriage thereupon, and the abutment means prevent extreme movement of the carriage from being transferred to the latch.

A further object of the invention is to provide a seat adjusting mechanism employing a fixedly mounted track, wherein the supporting means for the track and the track itself are of an integral construction and formed of sheet material, and wherein a high strength unit is produced with a minimum of weight and material.

These and other objects of the invention arising from the details and relationships of the components of an embodiment thereof will be apparent from the following description and accompanying drawings wherein:

FIG. 1 is a plan view of seat structure, in accord with the invention, shown in the rearmost position, a portion of one of the carriages being shown in section as taken along section I—I of FIG. 4, FIG. 2 is an elevational, sectional view of an adjustable seat structure, in accord with the invention, as taken along section II—II of FIG. 1 between the outer carriage side wall and the track outer side wall showing the carriage in the full forward position in full lines and in the rearmost position in dotted lines, FIG. 3 is a detail, bottom view of the carriage and track assembly of one side of an adjustable seat structure in accord with the invention, FIG. 4 is an elevational, sectional view of a carriage track assembly as taken along section IV—IV of FIG. 1, FIG. 5 is a detail, elevational view of the side of the adjustable seat structure, in accord with the invention, as taken along section V—V of FIG. 1, and FIG. 6 is a perspective, partially cut away view of a detail of a carriage, track and associated seat front channel member.

The seat structure, in accord with the invention, is mounted on a pair of brackets generally designated at 10, FIG. 1, which are of an elongated form and disposed parallel to each other and parallel to the longitudinal length of the vehicle in which the seat is installed. The brackets 10 include a horizontally extending lower portion 12 having holes defined therein, whereby mounting bolts 14 permit the brackets 10 to be mounted to the vehicle floor 16, FIG. 2. The brackets 10 are of a sheet material, usually steel, and may be provided with reinforcing depressions and webs where appropriate. The portion 18 of the brackets constitutes a base portion, and the portion 20 constitutes an interconnecting, or neck, portion between the track portion 22 and the base portion 18. It is a feature of the invention that the base portion 18, interconnecting portion 20 and track portion 22, be of an integral sheet metal construction, whereby maximum strength characteristics are provided with a minimum of weight and material.

The interconnecting portion 20 is of a planar, elongated configuration, and is disposed perpendicularly to the bracket lower portion 12 and the surface on which the bracket is mounted.

A first planar track lower wall portion 24 extends substantially perpendicularly to the interconnecting portion 20. A first side wall 26 extends at substantially right angles to the lower wall portion 24 and away from the bracket base portion 18. The track also includes an upper wall, generally defined at 28, which is substantially perpendicular to, and depends from, the side wall 26. An opposing or second side wall 30 depends from the upper wall 28, from which a second lower wall portion 32 perpendicularly depends, extending toward the lower wall portion 24. A planar, elongated flange 34 depends toward the base portion from the lower wall portion 32 in adjacent relation to the interconnecting portion 20. If desired, the flange 34 and the interconnecting portion 20 may be connected at space points by rivets, spot-welding, or the like. It will be appreciated that the construction of the track portion 22 results in a box-like substantially rectangular form of elongated configuration.

The upper wall 28 of the track portion 22 is depressed, forming a pair of spaced, parallel ridges 36 adjacent the side walls 26 and 30. The depressed portion of the upper wall defines a guideway 38 for reception of rollers, as will later be apparent.

The track portions 22 are provided with terminating ends disposed at substantially right angles to the length of the track, and an abutment 39 is lanced upwardly from the upper wall 28 immediately adjacent each of the track's ends FIGS. 4 and 6, in longitudinal alignment with the guideway 38, to prevent the rollers from rolling off the track, as later described.

The base portion of the brackets 10 is slotted, as at 40, FIGS. 2 and 3, in a central region, to provide access of a latch to the interconnecting portions 20. The interconnecting portions 20 and the flange 34, in the region of the slots 40 and throughout the length of the slots, are provided with a plurality of evenly spaced detent notches 42, FIGS. 2 and 3, which cooperate with latch means, as will later be described, to lock relative positions of the seat during adjustment.

As best illustrated in FIG. 1, the side walls 26 and 30 of the track portion 22 are provided with pairs of spaced holes 44. Leaf springs 46, having end-attaching portions 48 located within the holes 44, bow outwardly to slidably engage the carriage side walls. The outward bow of the springs 46 is due to the fact that the normal, unstressed distance between the end attachment portions 48 of a common spring is less than the distance between a pair of holes 44. Preferably, four sets of springs 46 and holes are associated with each track portion 22, two springs being located on each track side wall.

The adjustable seat structure includes a carriage 50 slidably mounted on the track portion of each bracket 10. As will be apparent from FIGS. 1, 2, and 4, the carriages 50 are of an elongated configuration and box-like cross section having an upper wall 52, side walls 54 substantially perpendicularly disposed to the upper wall 52, and bottom wall portions 56 disposed substantially parallel, and in opposed space relation, to the track lower walls 24 and 32. Elongated, planar flanges 58 extend downwardly toward the bracket base portion 18 from the carriage bottom walls 56 at right angles to the associated bottom wall portion. The flanges 58 are spaced so as to define a slot 60 into which the interconnecting portion 20 and the track flange 34 extend. As the carriage bottom walls 56 are substantially perpendicular to the carriage side walls 54, and are parallel to the track lower walls 24 and 32, the interlocking configuration of the carriage 50 and the track portion 22 prevents the carriage from being vertically removed from the track portion. The flanges 58 substantially increase the strength characteristics of the carriages against deformation due to a vertical pull. Thus, it will be apparent that the construction of the carriage will effectively resist the tendency for the carriage slots 60 to "open up" during vertical forces being applied in an upward direction away from the brackets 10.

The front ends of the carriages 50 are interconnected by a channel member 62, FIG. 2, which is bent at right angles at its ends and is welded to the front ends of the carriages. As will be apparent from FIGS. 2 and 6, the channel member 62 includes planar leg portions 64 and a base portion 66 interconnecting the leg portions 64. To permit interconnection of the channel member 62 to the carriages 50, the channel member ends are slotted at 68, FIG. 6, adjacent the intersection of the base and leg portions, permitting the leg portions 64 to be offset, producing portions 70 and 72, and the base portion 66 is formed inwardly at substantially right angles to the plane of the portions 70 and 72 to form a flange 74. The channel member portions 70 are welded to the upper walls 52 of the carriages 50, and the portions 72 are welded to the outer carriage bottom walls 56, as shown in FIGS. 4 and 6. Such assembly to the ends of the carriages 50 positions the flanges 74 over the end of the adjacent carriage and in alignment with the associated track portion 22. Thus, the flanges 74 function as a stop adapted to be engaged by the front end of the tracks 22, defining maximum rear adjustment of the seat structure.

The rear portions of the carriages 50 are interconnected by a member 76 welded or otherwise affixed to the carriages. The rear ends of the carriages 50 also include a bolt 78 extending between the side walls 54 having a spacer sleeve 80 inserted between the side walls to prevent the tightening of the bolt from collapsing or decreasing the distance between the carriage side walls. As will be apparent from FIG. 2, the bolt 78 and sleeve 80 function as a carriage-mounted abutment adapted to engage the rear end of the track portion 22 at maximum forward adjustment of the seat frame.

An apron or skirt 82, welded to the exterior side wall of the carriages 50 and the channel member 62, extends downwardly to shield the brackets 10 from view and provide anchorage for trim. The upper portions of the skirt 82 are provided with clips 84 disposed on the upper wall of the carriages by which spring structure, generally indicated at 86, may be attached to the adjustable seat frame, consisting of the carriages 50, channel member 62 and rear member 76.

A seat back hinge pin 88 is associated with and mounted on each of the carriages 50, whereby a seat back portion may be pivotally mounted to the seat frame. In the illustrated embodiment, the invention is shown as used with individual or "bucket" seats. However, it will be appreciated that the inventive concepts are equally applicable to any type of vehicle adjustable seat structure.

To lock the carriages 50 in the desired predetermined location, brackets 90 are mounted on the inner side of each of the carriages 50 which pivotally support a latch 92 extending into the slots 40 of the brackets and are adapted to selectively engage one of the track notches 42. The latches 92 are biased in a direction toward the adjacent notches 42 by springs 94, and a wire link 96 interconnects the latches 92 whereby the latches associated with each carriage simultaneously operate.

The latch operation is produced through a lever 98 and shaft 100 on which the left lock latch 92, FIG. 1, is mounted within its associated bracket. The front end of the shaft 100 is supported at 102, FIG. 2, on the underside of the channel member 62, and the lever 98 is exteriorly accessible at the front of the seat. Thus, when the operator raises the lever 98, the latches 92 will pivot out of engagement with the associated notch 42, permitting the seat frame to be moved on the brackes 10.

Preferably, spring anchors 104 are attached to the carriages 50, and a notch 106 is provided at the front portion of the brackets 10, permitting a tension spring 108 to be interposed between the anchor 104 and the front portion of the bracket 10 to bias the carriages 50 in a direction toward the front of the vehicle. Such springs aid in facilitating seat adjustment, as it is considerably easier to move a vehicle seat rearwardly than forwardly.

To facilitate movement of the carriages 50 upon the tracks 22, a pair of rollers is interposed between the upper walls 20 of each track 22 and carriage 50. The rollers 110 are of a width substantially corresponding to that of the guideway 38, FIG. 4, and are provided with an axial bore 112 which intersects both ends of the rollers. Spacing of the rollers 110 is obtained by a pair of U-shaped wire spacing members 114. The spacing members each include leg portions 116 and a base portion 118. The base portions 118 are formed with a convex bow in the direction away from that which the leg portions 116 extend, as will be appreciated from FIG. 1. The leg portions 116 of a common spacing member are inserted within the axial bore of each roller on a common side thereof, whereby two spacing members are associated with each pair of rollers. The fact that the base portions 118 are bowed outwardly causes the spacing member base portions to resiliently engage the side walls 54 of the carriage. This relationship aids in maintaining the rollers centrally located on the track and relative to the carriage, and prevents the rollers from "rattling" or undesirably moving within the carriage.

The seat belt cleats 120, as best shown in FIG. 5, may be of a planar configuration, including a hole permitting the clips to be mounted on the bolts 78 and an elongated slot 122 through which the seat belt 124 may be inserted. In this manner the seat belt anchors are exteriorly accessible, firmly attached to the carriages 50, and will not interfere with access to the seat, nor interfere with pivoting of the seat back rest.

As the extreme movement of the seat in the forward and rearward directions is terminated by direct engagement of the ends of the tracks 22 with sleeve 80 and bolt 78, and the flanges 74, respectively, such abutment forces are not imposed on the latches 92, as in many conventional constructions, and the likelihood of damaging or binding the latches is minimized. The ends of the tracks 22 thus constitute first and second abutments engaged with third and fourth abutments formed by the sleeves 80 and the flanges 74 on the carriage 50.

When using seat belts attached to the adjustable seat structure, the primary forces imposed on the carriages 50 during a collision will be in an upward and forward direction relative to the tracks 22. With conventional carriage constructions, the magnitude of the forces encountered in many collisions causes the carriage to "open" at the slot 60, thereby permitting the carriage to be completely removed from the tracks. The present invention provides superior strength characteristics to prevent the carriage from being lifted from the track, due to the perpendicular relationship between the carriage side walls 54 and the bottom wall portions 56, and the parallel relationship between the track lower walls 32 and the carriage bottom wall portions. Additionally, bending of the carriage and opening of the slot, due to vertical forces being applied to the carriage, are effectively resisted by the presence of the flanges 58 which are planar and disposed in the plane of the primary forces applied to the carriage during a collision. The construction, in accord with the invention, also provides superior resistance to excessive forward movement of the seat frame during a collision in that, even though latches 92 should fail, the seat frame will not leave the tracks 22 due to the direct abutment of the tracks with the sleeves 80 mounted on heavy bolts 78. Further improved strength characteristics result from the integral bracket 10 and track 22 construction.

It will be noted from FIGS. 1 and 3 that the rear end of the inner carriage side walls 54 is offset inwardly at 126. This construction permits use of a sleeve 80 of sufficient width whereby seat belts may be directly attached to the sleeves 80 and bolts 78 without requiring the cleats 120. Such an arrangement is shown in dotted lines in FIG. 5 wherein the seat belt 128 has a loop 130 defined at its end circumscribing the sleeve mounted on the bolt 78. In this type of seat belt installation, the seat belts 128 will pass below the lower edge of the seat back.

It is appreciated that modifications to the invention may be apparent to those skilled in the art without departing from the spirit and scope thereof, and it is intended that the invention be defined only by the following claims.

I claim:
1. In an adjustable seat mechanism, in combination,
    (a) a bracket adapted to be mounted on support structure,
    (b) an elongated, inner track mounted on said bracket, said track being of a substantially rectangular cross section having substantially parallel upper and lower walls and spaced side walls interconnecting said upper and lower walls,
    (c) an elongated bracket connecting portion laterally centrally defined on said lower wall and substantially perpendicular thereto,
    (d) an elongated, tubular seat frame carriage slidably mounted on and circumscribing said inner track, said carriage being of a substantially rectangular cross section having an upper wall, a bottom wall and spaced side walls interconnecting said upper and bottom walls,
    (e) antifriction roller means interposed between and disposed in engagement with said upper wall of said carriage and said upper wall of said inner track,
    (f) said carriage bottom wall being substantially parallel to and disposed adjacent said track lower wall, and
    (g) an elongated, centrally located slot defined in said carriage bottom wall, said bracket connecting portion extending through said slot.
2. In an adjustable seat mechanism, as in claim 1, wherein
    (a) resilient spring means are interposed between the side walls of said inner track and the side walls of said carriage slidably engaging the side walls of said carriage and tending to centrally bias said inner track with respect to said carriage.
3. In an adjustable seat mechanism, in combination,
    (a) an elongated track adapted to be mounted on support structure, said track including opposed side walls and an upper wall interconnecting said side walls,
    (b) an elongated, seat frame carriage slidably mounted on said track, said carriage including an upper wall and opposed, spaced side walls, said track being received within said carriage in parallel relation thereto wherein said track and carriage upper walls are in opposed parallel relation and each of said side walls of said track is disposed in opposed parallel relation to a carriage side wall,
    (c) a pair of rollers interposed between said upper walls of said track and carriage, and
    (d) resilient, bowed, spacing members interposed between said rollers maintaining spacing therebetween, said spacing members resiliently engaging said carriage side walls and laterally centering said rollers with respect to said track and carriage.
4. In an adjustable seat mechanism, in combination,
    (a) an elongated track adapted to be mounted on support structure, said track including opposed side walls and an upper wall interconnecting said side walls,
    (b) an elongated, seat frame carriage slidably mounted on said track, said carriage including an upper wall and opposed, spaced side walls, said track being received within said carriage in parallel relation thereto wherein said track and carriage upper walls are in opposed parallel relation and each of said side walls of said track is disposed in opposed parallel relation to a carriage side wall, (c) a pair of rollers interposed between said upper walls of said track and carriage, each of said rollers having a first end and a second end, (d) axial openings defined in said rollers intersecting said ends, (e) a pair of U-shaped, resilient spacing members interposed between said rollers, each of said spacing members including leg portions and a base portion, said base portion being convexly bowed in the direction opposite to that direction in which the associated leg portions extend, the leg portions of one of said spacing members being rotatably received within the openings intersecting said first ends of said rollers and the leg portions of the other spacing member being rotatably received within the openings intersecting said second ends of said rollers, the bowed base portions of said spacing members engaging the side walls of said carriage.

5. In an adjustable seat mechanism, as in claim 4, wherein (a) a depressed, elongated guideway is defined in said track upper wall, said rollers being received within said guideway, (b) terminating ends defined on said track, and (c) an abutment formed from said track at each terminating end thereof longitudinally aligned with said guideway maintaining said rollers within said guideway.

6. In an adjustable seat mechanism, in combination, (a) an integral sheet metal bracket including a base portion, an inner track portion and a connection portion, (b) said inner track portion being of a box-like cross section having an upper wall, spaced side walls and a lower wall, said connecting portion merging into said bottom wall and centrally disposed thereto with respect to said side walls, (c) an elongated, tubular seat frame carriage slidably mounted on and circumscribing said inner track, said carriage being of a box-like cross section having an upper wall, a pair of spaced, parallel side walls depending from said upper wall, and a bottom wall portion depending from each of said side walls substantially perpendicular to the associated side wall, said bottom wall portions extending toward each other and disposed adjacent and substantially parallel to said inner track lower wall, an elongated flange defined on each of said bottom wall portions spaced from the associated side wall and extending away from said carriage upper wall, (d) said flanges being spaced from each other defining an elongated slot providing access into the interior of said carriage, said bracket connecting portion extending through said slot, (e) a pair of spaced rollers are interposed between the upper wall of said inner track and the upper wall of said carriage, and (f) spacer means interconnecting said rollers and maintaining predetermined spacing therebetween.

7. In an adjustable seat mechanism, (a) a pair of laterally spaced support brackets, (b) a pair of elongated inner track members each of which has a pair of ends, (c) each of said elongated inner track members being of substantially rectangular cross section having upper, lower and side walls and being mounted on one of said brackets so that said bracket extends downwardly from said lower wall between said side walls, (d) a carriage including a pair of elongated seat frame members of substantially rectangular cross section, (e) each of said seat frame members being slidably mounted on and circumscribing an inner track member and having upper and lower walls, (f) antifriction roller means interposed between and disposed in engagement with said upper walls of each inner track member and the seat frame member mounted thereon, (g) each of said seat frame members having the lower wall thereof disposed adjacent the lower wall of the inner track member on which said seat frame member is mounted and having an elongated slot formed therein through which said bracket extends, (h) coacting latch means on said carriage and at least one of said track members for latching said carriage in predetermined moved positions thereof, and (i) means on said carriage forming abutments engageable with said ends of said inner track members in maximum moved positions of said carriage in directions lengthwise of said track members.

References Cited by the Examiner

UNITED STATES PATENTS

| | | | |
|---|---|---|---|
| 2,275,656 | 3/1942 | Saunders | 248—429 |
| 2,336,433 | 12/1943 | Woina | 248—430 |
| 2,622,940 | 12/1952 | Johnson | 248—430 |
| 2,667,912 | 2/1954 | McCormick | 248—430 |
| 2,715,433 | 8/1955 | Dolgorukov | 248—430 |
| 3,007,668 | 11/1961 | Dall | 248—429 |
| 3,120,371 | 2/1964 | Dall | 248—430 |

CLAUDE A. LE ROY, *Primary Examiner.*